(12) United States Patent
Maier et al.

(10) Patent No.: US 12,050,866 B2
(45) Date of Patent: Jul. 30, 2024

(54) MAINTENANCE OF A DATA GLOSSARY

(71) Applicant: International Business Machines Corporation, Armonk, NY (US)

(72) Inventors: Albert Maier, Tuebingen (DE); Michael Baessler, Bempflingen (DE); Peter Gerstl, Holzgerlingen (DE); Oliver Suhre, Stuttgart (DE); Thomas Schwarz, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 17/120,201

(22) Filed: Dec. 13, 2020

(65) Prior Publication Data

US 2022/0188512 A1 Jun. 16, 2022

(51) Int. Cl.
*G06F 40/247* (2020.01)
*G06F 11/34* (2006.01)

(52) U.S. Cl.
CPC ........ *G06F 40/247* (2020.01); *G06F 11/3476* (2013.01)

(58) Field of Classification Search
CPC .. G06F 40/247; G06F 11/3476; G06F 40/237; G06F 40/242; G06F 40/284; G06F 16/00; G06F 16/313; G06F 16/3344; G06F 16/337; G06F 16/7837; G06F 16/784; G06F 18/295; G06F 40/42; G06F 40/49; G06F 40/58; G06F 16/3329; G06F 9/45508; G06F 7/10; G06F 16/40; G06F 16/182; G06F 16/36; G06F 16/374; G06F 18/251; G06F 18/253; G06F 40/205; G06F 16/156; G06F 16/172; G06F 16/1744; G06F 16/1815; G06F 16/211; G06F 16/2255; G06F 16/2272; G06F 16/2282; G06F 16/24534; G06F 16/24547; G06F 16/24549; G06F 16/3335; G06F 16/951; G06F 18/28; G06F 40/10; G06F 40/186; G06F 40/253; G06F 40/30; G10L 15/02; G10L 15/063; G10L 15/187; G10L 15/22; G10L 2015/025; G10L 2015/0635; G10L 13/08; G10L 15/26; G10L 17/22; G10L 19/00; G10L 19/0208; G10L 19/032; G10L 19/24; G10L 19/02; G10L 19/06

See application file for complete search history.

(56) References Cited

U.S. PATENT DOCUMENTS

| | | | | |
|---|---|---|---|---|
| 8,311,807 | B2* | 11/2012 | Kang | G06F 40/49 |
| | | | | 704/10 |
| 9,208,144 | B1* | 12/2015 | Abdulnasyrov | G06F 40/42 |
| 11,631,025 | B2* | 4/2023 | Sato | G06F 40/242 |
| | | | | 706/12 |

(Continued)

FOREIGN PATENT DOCUMENTS

| | | | | |
|---|---|---|---|---|
| EP | 1975817 | * | 10/2008 | G06F 17/30 |
| JP | 4297623 | B2 * | 7/2009 | |
| WO | 2017098403 | A1 | 6/2017 | |

*Primary Examiner* — Abdelali Serrou
(74) *Attorney, Agent, or Firm* — Jared C. Chaney (57) ABSTRACT

A system may receive a data glossary comprising a list of terms. The system may then measure a usage dimension for a set of the terms from the list of terms. The system may select a candidate term from the set based on the usage dimension and perform a maintenance action on the candidate terms.

20 Claims, 4 Drawing Sheets

(56) References Cited

U.S. PATENT DOCUMENTS

| | | | |
|---|---|---|---|
| 2008/0195380 A1* | 8/2008 | Ogasawara | G06F 40/242 |
| | | | 704/E15.001 |
| 2015/0248477 A1 | 9/2015 | Bhat et al. | |
| 2016/0162825 A1 | 6/2016 | Dan et al. | |
| 2016/0228775 A1* | 8/2016 | Dumitrescu | A63F 13/53 |
| 2019/0251103 A1* | 8/2019 | Mizobuchi | G06F 16/337 |
| 2020/0043498 A1* | 2/2020 | Chae | G10L 15/26 |
| 2020/0126561 A1* | 4/2020 | Kofman | G11B 27/031 |
| 2020/0151629 A1 | 5/2020 | Chandrasekaran et al. | |
| 2020/0184370 A1 | 6/2020 | Ben-Arie | G06F 18/2321 |
| 2021/0142789 A1* | 5/2021 | Gurbani | G10L 15/16 |
| 2021/0319174 A1* | 10/2021 | Raj | G06F 40/242 |

\* cited by examiner

MAINTENANCE OF A DATA GLOSSARY

BACKGROUND

The present invention relates to the computer-based operation and maintenance of data glossaries such as business glossaries.

Business glossaries are used by organizations to provide definitions of common vocabulary for an organization. Business glossaries may be a key feature of mature modern information governance (data governance) solutions. Without standardizing and documenting an organization's terminology, people may be unable to fully understand governance policies and rules, and may struggle to properly implement and enforce those rules, be it data quality, data protection, lifecycle management or other kinds of policies. Business glossaries may also be useful in modern self-service infrastructures where knowledge workers such as data scientists and business analysts are entitled to search for useful data to work with. If information assets are classified with the business terms an organization is using, this may help knowledge workers to find what they are interested in. Knowledge workers may start with searching the standardized business terminology and in response may receive data that fits to the respective business concept. This may significantly help to find relevant data and may reduce the risk that data is misused due to a wrong understanding regarding what it is representing.

SUMMARY

Embodiments of the present disclosure include a method, system, and computer program product for maintenance of a data glossary.

Embodiments of the present disclosure include a method comprising receiving a data glossary comprising a list of terms, measuring a usage dimension for a set of the terms from the list of terms, selecting candidate terms from the set based on the usage dimension, and performing a maintenance action on the candidate terms.

Additional embodiments of the present disclosure include a system comprising a memory, and a processor in communication with the memory, the processor being configured to perform operations comprising receiving a data glossary comprising a list of terms, measuring a usage dimension for a set of the terms from the list of terms, selecting candidate terms from the set based on the usage dimension, and performing a maintenance action on the candidate terms.

Further embodiments of the present disclosure include a computer program product comprising a computer readable storage medium having program instructions embodied therewith, the program instructions executable by a processor to cause the processors to perform a method, the method comprising receiving a data glossary comprising a list of terms, measuring a usage dimension for a set of the terms from the list of terms, selecting candidate terms from the set based on the usage dimension, and performing a maintenance action on the candidate terms.

The above summary is not intended to describe each illustrated embodiment or every implementation of the present disclosure.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Business glossaries and other kinds of data glossaries are typically used as a depot for terms that occur in data elements generated during operations and activities. Without regular analysis regarding traits such as similarity and importance of the terms, data glossaries increase in size and complexity over time. It is therefore desirable to have an approach that simplifies maintenance of a data glossary, to maximize the usefulness of the data glossary, by balancing the requirements of compactness and precision.

As will become clear from the following explanations, embodiments of the invention may have the advantage that maintained terms in the data glossary may be identified for the performance of the maintenance action based on their usage. Embodiments may have the advantage that the performance of the maintenance action may be limited to certain maintained terms of the data glossary based on their usage. Embodiments may provide an effective approach for maintaining the data glossary by deploying usage dimensions as means for quantifying the usage of the maintained terms. Embodiments may provide a flexible approach for maintaining the data glossary by allowing a system to assess the usage of the maintained terms using multiple quantitative usage dimensions. Embodiments may make use of a computing environment that provides a persistent, accessible, comprehensive documentation of the terms' usage at a high degree of detail that may be less error-prone than a manual documentation. Embodiments may allow for analyzing the usage of maintained terms in a systematical, unbiased manner that may be less error-prone than a manual analysis. Embodiments may be beneficial for defining a routine of managing the size and quality or usefulness of the data glossary based on quantitative evidence of term usage.

Embodiments of the invention may support the operation of a data glossary, which is understood herein as a collection of terms and their definitions and which may also be referred to herein as "the glossary" for simplicity. A data glossary may be an implementation of an ontology defining a standardized terminology (terms and their definitions) that may optionally contain additional information such as synonyms, abbreviations and information describing relationships of the glossary's terms. Depending on context, the word "term" may refer herein to an actual term, i.e., a string of one or more human-readable words that are stored as a single entry in the data glossary together with their assigned definition, but also to a single dataset stored by the data glossary that may contain at least the actual term string and its assigned definition. Additionally, unless where explicitly noted, the unspecified word "term" may refer to a maintained term (dataset or string) as defined herein.

The data glossary may be stored in a computer memory that may be located and accessible within a computing environment where data elements may be available that use single terms of the data glossary. Many feasible choices of data structures are known for implementing a data glossary, such as, without limitation, a graph comprising nodes representing the terms and edges representing mutual relationships of the terms. A term dataset comprised by the data glossary may comprise further information such as, without limitation, attributes denoting a relationship of the term to other terms in the glossary and/or data structures and/or data elements available in the computing environment. Some or all of the glossary's terms may be maintained terms that are subject to execution of embodiments of the method described herein. Terms may be processed using, e.g., their term string or a unique identifier that may be beneficial for discerning different term datasets having an identical term string. The data glossary may comprise further information such as labels or categories by which the terms may be grouped; and/or time information such as a time of creation or of a most recent change of a term.

Embodiments may provide approaches for maintaining the maintained terms of a data glossary. There may be multiple maintenance reasons for which an execution of the method may be worthwhile. For reasons of conciseness, the discussion herein will be limited to the example cases that a term is used infrequently (i.e., the maintenance reason being "infrequent use") or that a term has a poor quality (i.e., the maintenance reason being "need for definition improvement"). However, those skilled in the art will appreciate that various other maintenance reasons may exist that may render a deployment of embodiments useful, with a straightforward application of the concept of usage dimensions and maintenance actions discussed herein to the respective maintenance reason.

Specific to a given maintenance reason, embodiments may deploy a step of measuring one or more usage dimensions for each maintained term. In some embodiments, a usage dimension is based on the usage of a term by one or more users. A usage dimension may be characterized by one specific, predetermined kind of evidence of usage that a given term may exhibit or not and that may be reproducibly measured by execution of a usage measuring algorithm. Of course, it may be possible to define a modular approach that may load and execute, e.g., one procedure or function as the usage measuring algorithm for each measured usage dimension. Alternatively or additionally, instructions for measuring multiple usage dimensions may be integrated in a general algorithm, e.g., one algorithm adapted for measuring some or all usage dimensions of one or more maintenance reasons.

The evidence of usage may be any kind of data or other logical structure that is considered by a competent person as being representative of the maintenance reason. In other words, if a usage measuring algorithm finds a particular piece of evidence of usage for a given term, such a competent person would consider this piece as a hint (taken alone or in combination with evidence representing other usage dimensions of the same maintenance reason) that an execution of a predefined maintenance action specific to the maintenance reason on the given term is necessary. Typically, the competent person can be considered as the person conceiving the usage measuring algorithm in order to find the evidence of usage. It may be beneficial to provide an interface allowing users to define new usage dimensions by programming new usage measuring algorithms that are adapted for providing a value of the new usage dimension in response to receiving a term (its term string or other identifier). The usage measuring algorithm may find such evidence at least in the glossary, possibly also in further data sources available in the computing environment, and may return a value for the given term in its respective usage dimension.

For each maintenance reason, the maintained terms may be prioritized based on the value(s) measured for one or more of the usage dimensions of that maintenance reason. The prioritization of a given term may be based on a maintenance priority that the competent person may consider as an appropriate representation of a likelihood that an execution of said maintenance action is necessary in order to support the goal of balancing conciseness and precision of the data glossary. For this purpose, it may be apt to use the measured value of a single usage dimension or a result of mathematical processing of the value(s) of one or more of the usage dimensions of the current maintenance reason as the maintenance priority of a given maintained term. A prioritization based on a combination of values measured for the given term in multiple usage dimensions may yield a more significant maintenance priority than using the value of a single usage dimension as the maintenance priority. The prioritization may include sorting the maintained terms by their maintenance priority.

A portion of the prioritized terms may be selected as candidate terms based on their maintenance priority. A maintenance threshold criterion may be applied such that any term having a maintenance priority that is equal to or exceeds a predefined candidate maintenance threshold value is included in the selection of candidate terms. This selection may be provided to an entity (such as a user having access to the computing environment, or a computing system executing an appropriate artificial-intelligence technique such as a trained neural network or other trained machine-learning model) that the competent person may consider as capable of deciding whether a given term should indeed be processed by the maintenance action respectively assigned to the given maintenance reason. In other words, a usage-based selection of candidate terms for glossary maintenance may be presented to an entity capable of deciding for each of the selected terms if it should be included in the corresponding maintenance procedure or not.

It may be advantageous to collect the selection of candidate terms and to temporarily store this collection without providing it to the deciding entity if the number of candidate terms in the selection is below a predefined maintenance threshold value. Instead, additional candidate terms may be added to the selection during one or more subsequent runs of the method, so that the candidate terms collected in earlier runs of the method are provided during a later run when the number of candidate terms equals or exceeds the maintenance threshold value.

Additional information may be provided together with the selection of candidate terms, such as explanatory information descriptive of the evidence of usage found for each candidate term in one or more of the measured usage dimensions. Non-limiting examples thereof may include findings such as a given term having a number of relationships to files/logical rules/etc. below a predefined maintenance threshold or a number of accesses to its term definition within a predefined time window being equal to or greater than a predefined threshold.

In response to the provision of the selection of candidate terms, the computing system executing an embodiment of the method may receive, from the entity to which the selection of candidate terms was provided, a selection of confirmed terms that can be regarded as a subset of the selection of candidate terms. The confirmed terms may comprise those candidate terms for which the deciding entity found that the need for performing the maintenance action on those terms is true. The selection of candidate terms and the selection of confirmed terms may be implemented in various forms such as a list, group or set of term strings or term identities, or as flags or markings of the respective terms in the data glossary.

The implementation approaches for the selection of candidate terms and the selection of confirmed terms do not necessarily have to be identical. If both selections are implemented by flagging of terms in the glossary, it may be necessary to provide a mechanism that removes (limited to a given maintenance reason) candidate flags at least from all terms to avoid double flagging, or only from those terms for which no confirmation flag is set if candidate flags are automatically removed during confirmation flagging. Alternatively, it may be possible to have the deciding entity remove candidate flags of any terms for which a decision was made, or at least for those terms that are not confirmed.

Embodiments of the method may further comprise executing the maintenance action that is predefined for the given maintenance reason on each of the confirmed terms. This may be done subsequent to the receipt of the selection of confirmed terms, but it may also be possible to receive the confirmed terms after completion of the maintenance action, which may be done by the deciding entity itself or by a further entity (computing system or user) that is commissioned by the deciding entity for performing the maintenance action. This may be useful for reducing or preventing delays of the data glossary maintenance if the given maintenance action comprises an amendment of the confirmed terms. If the maintenance action is performed before the receipt of the confirmed terms, the receiving computing system may obtain a unique assignment between each of the received confirmed terms (that have already been amended or processed otherwise) to a corresponding provided candidate term, and update the corresponding terms in the data glossary. If the maintenance action is performed after receiving the selection of confirmed terms, the respective maintenance action may be performed by the computing system implementing an embodiment of the method, a further computing system commissioned by the implemented system, and/or a user. Non-limiting examples of maintenance actions comprise an automatic or semi-automatic deletion, a labeling or listing as being confirmed as needing improvement, or starting an interactive term editing session via a user interface.

It has to be noted that the "usage" or "use" of a given term in a data element or data structure may refer to an explicit occurrence of the term string or an equivalent identifier of the term dataset of the given term in said data structure or data element, but may also refer to an implicit use of the term, as may be the case, without limitation, if said data structure or element uses an instance of the term, wherein an instance of a term may be regarded as another data structure or another data element that explicitly occurs in the data structure or data element and is denoted by the given term. A data structure is understood herein as any form of structured data such as, without limitation, a data type, a file, a file type, a content type, or a logical rule or statement, and a data element may refer to any concrete instance of a data structure, such as a specific dataset having a given file type, or a specific file having a given file type.

As a non-limiting example of an explicit usage, a string comprising the words "client address" in a column heading in a spreadsheet may be regarded as a usage of the term "client address" by the specific data element being the spreadsheet where said column heading occurs (in other words, the term "client address" has a relationship to the specific spreadsheet), as well as a usage of the term "client address" by the data structure "spreadsheet" (in other words, the term "client address" has a relationship to the data structure "spreadsheet"). In the example, an implicit use may refer to the case that the spreadsheet does not contain the term "client address" in one of its cells, but as an internal descriptor of a data type that is defined for a range of its cells but is usually not displayed as spreadsheet content to a user. Another example of an implicit use may be a case where the spreadsheet contains e-mail addresses of so-called gold customers, and the data glossary defines "e-mail address" as a child term of "contact data", and "gold customer" as a subcategory of the term "account type". In this example, the spreadsheet may establish a relationship between the terms "account type" and "contact data".

A user or other deciding entity may reject a suggested candidate term. In this case, a time period may be defined during which a repeated suggestion of the rejected term as a candidate term for the same maintenance reason is suppressed. This may be realized by adding, e.g., a "deletion rejected" tag or, respectively, an "improvement rejected" tag to the term, together with an indication when the time span ends, which may be checked every time the method is executed. After such a time span, the rejection tag may be deleted, so that, if the procedure subsequently identifies the term as a candidate term again, it may become included in the provided selection of candidate terms once more.

A policy may be defined for a hierarchical treatment of terms that are candidate terms for more than one maintenance reason. For instance, a term that is a candidate term and/or a confirmed term both for deletion and improvement may be deleted by policy if deletion is considered more important than improvement, or may alternatively be removed from the deletion candidates by policy if improvement is considered more important than deletion. In the latter case, the respective term may be given a skip tag with an indication of a time interval during which the term is exempt from the maintenance assessment.

Embodiments of the method may be executed regularly, e.g., based on a schedule. It may be recommendable to perform an embodiment of the method repeatedly to account for changes of the glossary as they may continuously occur during its normal operation. The timing of maintenance repetition may be oriented at the frequency of such changes, wherein different maintenance reasons, depending on considerations of their respective criticality, may require equal or different repetition time scales.

According to some embodiments, the data glossary is further adapted for storing assignments between the maintained terms and relationship attributes out of a predefined group of one or more relationship attributes, each relationship attribute in the group of relationship attributes specifically representing a related data structure, at least one of the one or more maintenance reasons comprising an infrequent use of a given maintained term, at least one of the one or more usage dimensions specific to the infrequent use of the given maintained term being a relational usage dimension assigned to a given one of the one or more relationship attributes, the related data structure represented by the given relationship attribute being a given related data structure, the usage measuring algorithm to be executed for performing the measurement of the relational usage dimension being a relational usage measuring algorithm, wherein, for the relational usage measuring algorithm, the evidence of usage of the given maintained term within the given related data structure comprises an assignment between the given maintained term and the given relationship attribute. In some embodiments, the system may store one or more relationship attributes representing a related data structure for a grouping of the terms. In some embodiments, the data structure is selected from the group consisting of a logical rule, a file, a file type, and a content type.

The maintenance reason of infrequent use of a term may be based on the assumption that the frequency of using a term is a hint of its importance or usefulness. In simple words, this embodiment may also be based on the assumption that a frequently used term has more relationships to data structures (i.e., more data structures using the term, and/or more instances of usage of the term by the same data structure) than an infrequently used term. It may be assumed further that each instance of usage of a given term by a given data structure is represented in the glossary by an assignment of a relationship attribute of the given data structure to the given term. This embodiment may be understood such that it may be advantageous to assess infrequent use of a given maintained term by analyzing its relationships. This may be done by defining one or more of the usage dimensions specific to the maintenance reason of infrequent use as relational usage dimensions measured by a corresponding relational usage measuring algorithm. Using relationship attributes to assess infrequent use of a term may have the advantage that the computing system implementing this embodiment does not have to search the computing environment for occurrences of the term in the available data structures and data elements.

Term-to-term relationships may be defined according to public thesaurus standards such as ANSI/NISO Z39.19 and ISO 25964. These thesaurus standards define the three general term-relationship types hierarchical, equivalence, and associative relationships. The hierarchical relationships may be generic (the narrower term, NT, is a subset or subcategory of the broader term, BT), whole-part (the NT is a component or part of the BT), instantial (the NT is an instance of the BT), and polyhierarchical (one NT having multiple BTs). The equivalence relationship denotes correspondence of two terms that are regarded as (nearly) the same in a wide variety of contexts and may be virtually interchangeable. Examples of equivalences include synonyms, lexical variants, quasi-synonyms, abbreviations, proprietary-name synonyms, etc. The associative relationship is used to suggest additional or alternative terms to search for.

According to some embodiments, the determination of the value of the relational usage dimension comprises counting the assignments between the given relationship attribute and the given maintained term by the relational usage measuring algorithm. Compared to approaches involving mathematical or otherwise computational processing, counting the number of relationship attributes may have the advantage of a reduced consumption of computing resources for maintaining the data glossary. In the example of an implementation of the glossary by a graph, mutual relationships of a given term to other terms in the data glossary may be counted by counting the edges connected to the given term. Alternatively or additionally, any other structural representations of relationships such as, without limitation, keywords, flags, pointers, etc. may be counted appropriately.

According to some embodiments, the determination of the value of the relational usage dimension comprises counting a number of changed assignments between the given maintained term and at least one of the one or more relationship attributes within a predefined first time period by the relational usage measuring algorithm. Without limitation, a changed assignment may comprise a generation of a new assignment of a relationship attribute, a cancellation, amendment, or replacement of an existing assignment of a relationship attribute, or a change of an existing relationship attribute itself. This may be based on the assumption that a glossary is a dynamic system and that a term that is not used for new activities tends to be outdated. This may have the advantage of a more comprehensive determination of the selection of candidate terms. Focusing the measurement on the first time period may further reduce the computational effort for performing the method and may allow for responding to recent changes that may occur in the use of some terms. Preferably, the first time period includes the present time of execution of the method and may be chosen so as to reflect a typical time scale on which a significant change in relevance may be expected. Assignment-change usage dimensions may be fanned out by relationship type, e.g., it may be feasible to distinguish between the usage of a given term for new files in the computing environment and its usage or importance for new governance artifacts.

According to some embodiments, the related data structure is selected from the group comprising a logical rule, a file, a file type, a content type, and a term comprised by the data glossary. This may have the advantage that the maintenance of the data glossary may be performed with a higher selectivity on specific subsets of maintained terms in the data glossary, such that a single performance of the method may be less demanding on computing resources than a maintenance of the full glossary.

In particular, a low number of relationships to logical rules may indicate that a term is not relevant for governance or compliance. A relationship between a term and a logical rule may be established by a usage of the term by the rule. For instance, a logical rule may stipulate that a dataset of a gold customer must have a portion of non-empty entries of at least 90%. Taking into account that, according to the example, a "gold customer" is an instance of a glossary term "account type" and the example logical rule belongs to a group of data quality rules, said rule defines a relationship between the glossary term "account type" and the rule type "data quality."

A rule-relationship usage dimension may be fanned out by distinguishing between specific rule types, e.g., abstract governance rules, data protection rules, data quality rules, information lifecycle management rules, etc. A low number of relationships between a term and files such as tables or text-based documents may indicate that a term is not relevant for data self-service. A file-relationship usage dimension may be fanned out by considering specific files only. For instance, in a system that labels specifically important files as "critical data element" (CDE), it may make sense to distinguish between relationships to CDE files and non-CDE files, and give more weight to the CDE sub-dimension when overall usage counts for terms are determined.

Similarly, the relevance of a term may be determined using relationships between a term and a content type such as, without limitation, business intelligence reports, notebooks, machine-learning model training sets, etc. Term-content type usage dimension may be fanned out by information asset type (e.g., a specific dimension for reports) and/or labelling (e.g. a specific dimension for executive reports). Considering a predefined time period may also be possible (e.g., currently active executive reports). Furthermore, a higher number of term-term relationships may indicate that the given term is important for the understanding of other terms.

According to some embodiments, the maintenance action associated with the infrequent use of the given maintained term comprises a deletion of the given maintained term from the data glossary. A deletion of infrequently used terms may increase the computational efficiency for maintaining the glossary and may contribute to an increased relevance of the remaining terms. Deletions may be performed automatically, optionally after querying a final confirmation of deletion from a known competent user. Likewise, a warning about automatic deletion may be issued, e.g., if the number of terms to be deleted at the same time (i.e., by the same instance of the method) equals or exceeds a predefined threshold value.

According to some embodiments, at least one of the one or more maintenance reasons comprises a need for improvement of the given maintained term, the one or more usage dimensions specific to the need for improvement of the given maintained term comprising a temporal usage dimension, the usage measuring algorithm for determining the value of the temporal usage dimension for the given maintained term being adapted for detecting the evidence of usage of the given maintained term within a predefined second time period.

It may be beneficial to restrict the measurement of usage dimensions for the maintenance reason "need for improvement", i.e., the search for maintained terms that appear to have a potential of increased relevance if adequately amended, to a second time period that preferably includes the present time of execution of the method to account for the assumption that the relevance of a term may vary on a time scale represented by the second time period (e.g., measure the usage dimensions based on evidence that occurred during the last 12 months). This may maximize the significance of the provided candidate terms and may thus reduce the risk of finding candidate terms that appear irrelevant only because the measurement was performed in a too small or too large time window.

According to some embodiments, each maintained term further comprises a term definition, the determination, by the usage measuring algorithm, of the value of the temporal usage dimension for the given maintained term comprising counting accesses to the term definition of the given maintained term from a user interface. This approach may be based on the assumption that a large number of requests indicates that the term string and/or its term definition are not good enough to understand the given term semantically. This may provide a highly selective measure for assessing a need for improvement and may thus have the advantage of a reduced amount of false-positive candidate terms, which may contribute to a more efficient use of computing resources by embodiments of the method.

According to some embodiments, the data glossary is further adapted for storing user comments for each maintained term, the determination, by the usage measuring algorithm, of the value of the temporal usage dimension for the given maintained term comprising counting the user comments for the given maintained term; and/or the data glossary is further adapted for storing user ratings for each maintained term, the determination, by the usage measuring algorithm, of the value of the temporal usage dimension for the given maintained term comprising determining a characteristic of negative user feedback based on the user ratings for the given maintained term.

A user rating is understood herein as a numerical item that is assigned to a given term by a user and may reflect a scale between a number representing a highly useful term and another number representing a term of inferior relevance or other quality. This may be regarded as a "direct" numerical evidence for the need of improvement. On the other hand, the number of user comments may reflect the observation that is that users typically do not comment on a term if its relevance of usefulness matches the user's needs and expectations perfectly, while comments or discussions often focus on characteristics of terms and/or their definitions that are questionable. These approaches may provide an increased selectivity on terms with a high need for improvement, and may thus contribute to a more efficient use of computing resources by embodiments of the method. A characteristic of negative user feedback may comprise an aggregate measure such as an average rating and/or the number or sum of ratings in one or more predefined lowest-ranking categories.

According to some embodiments, the maintenance action associated with the need for improvement of the given maintained term comprises an addition of the given maintained term to a group of terms to be improved, the method further comprising, in response to providing one or more of the terms to be improved to a user interface: receiving one or more updated terms from the user interface, each updated term corresponding to one of the terms to be improved; for each updated term, removing the corresponding term to be improved from the group of terms to be improved, and replacing the corresponding term to be improved by the updated term in the data glossary.

As manual amendments of terms may be time-consuming, it may be advantageous to store a given confirmed term in the group of terms to be improved until a user is ready to enter the required amendment for the given confirmed term. The group of terms to be improved may have the further advantage of allowing for skipping the terms to be improved from subsequent measurements for assessing a need for improvement, which may reduce the requirement of computational resources for performing embodiments of the method. In addition, a mechanism may be deployed for providing a warning to a user interface, e.g., if the number of terms to be improved equals or exceeds a predefined threshold value.

According to some embodiments, each usage dimension has assigned a predefined dimension weight, the prioritization comprising determining the maintenance priority based on the one or more of the measured usage dimensions weighted by their respective dimension weight. This may allow for increasing the significance of the maintenance priority by assigning to more significant usage dimensions a higher dimension weight than to less significant usage dimensions. The maintenance priority may be determined comprising an aggregate measure, such as a weighted sum like the sum over all considered usage dimensions of the respective dimension weight times the respective value of the usage dimension. Other weighted-aggregate calculations are known to those skilled in the art.

Similarly, it may be possible to assign a term weight to some or all of the maintained terms, wherein the prioritization of a given term is additionally based on its term weight. This may have the advantage that terms of a more important, significant or meaningful portion of the glossary may receive higher maintenance priority than terms in less important, significant or meaningful portions of the glossary, such that the more important terms may become maintained earlier that less important terms. On the other hand, it may be worthwhile to assign a higher term weight to terms within portions of the glossary which are known to have a lower quality than terms in known high-quality portions, such that the low-quality terms may become improved earlier and a consumption of computational resources for improving high-quality terms may become less probable. It may be possible to assign a term weight to merely a portion of the glossary and to assume a predefined standard weight for all new terms or terms to which no term weight has been assigned yet. In an example, the data glossary of an enterprise comprises one portion of terms with a high term weight that are generated and maintained by authorized persons of the enterprise to support central assets of the enterprise, one portion of standard business terms with a low term weight that were purchased from an external provider for completeness purposes, and one portion of terms having a standard or average weight that were generated during short-term projects of the enterprise. Dimension weights and term weights may be changed, e.g., by users depending on their estimation of a term's importance, significance or meaningfulness.

According to some embodiments, each usage dimension has further assigned a criticality indicator, the prioritization further comprising changing the dimension weight of the one or more of the measured usage dimensions based on the criticality indicator. A criticality indicator may, e.g., be chosen from a predefined group of criticality categories such as "high criticality", "normal", and "low criticality", or may be incorporated e.g. as a flag indicating high priority if it is present or set and normal priority if it is missing or clear. Criticality indicators may be advantageous to control the consumption of computational resources by embodiments of the method. For instance, the measurement may be limited to usage dimensions having a high-valued criticality indicator for all terms having a number of relationships that exceeds a predefined threshold, while additional usage dimensions may be measured for maintained terms with a lower number of relationships to obtain a more significant maintenance priority for these terms. In analogy to the term weights described above, maintained terms may be assigned (e.g., by a user) a term maintenance criticality highlighting, e.g., terms for which a maintenance action is considered especially important.

According to some embodiments, the data glossary is further adapted for storing a skip indicator for each maintained term for each maintenance reason, the measurement of the one or more usage dimensions specific to a given maintenance reason for a given maintained term further comprising skipping the execution of the usage measuring algorithm for the given maintained term if the skip indicator of the given maintained term indicates non-eligibility of the given maintained term for the given maintenance reason. In some embodiments, the system may skip the performing of the maintenance action for a term based on a skip indicator in the data glossary.

A skip indicator may be set as a flag, a label, or other data element assigned to a given maintained term. This may be beneficial for reducing the consumption of computational resources by embodiments of the method. Terms may be skipped under a certain policy such as, without limitation, avoiding a revisit (e.g., within a predefined time period) of terms which have been rejected by the deciding entity for performance of the maintenance action. In another example, a user who just created a new term dataset that is not yet ready for publication in the computing environment may set a skip indicator for the new term dataset and remove it when publication of the new term has been approved.

According to some embodiments, the provision of the selection of candidate terms comprises providing the selection of candidate terms to a user interface and/or a trained machine learning model. Providing the selection of candidate terms to a user interface may allow a user to review the candidate terms for deciding whether a given candidate term should be added to the selection of confirmed terms or rejected terms. This may yield the selection of confirmed terms with a high importance. Providing the selection of candidate terms to a trained machine learning model may allow for determining the selection of confirmed terms with an improved computational efficiency and significance compared to other computational deciding approaches. The output of the machine learning model may be interpreted as a probability for each candidate term that the maintenance action of the respective maintenance reason is required. In an example, the selection of candidate terms may be provided first to a trained machine learning model and the output of the machine learning model is then provided to the user interface together with the selection of candidate terms, wherein an assignment of each candidate term to its corresponding output received from the trained machine learning model is presented to a user as supportive evidence that may facilitate the user's decision.

According to some embodiments, the method further comprises repeating the method according to a predefined first schedule specific to the one or more maintenance reasons; and/or the method further comprises repeating at least the measurement of the one or more usage dimensions and the prioritization of the maintained terms according to a predefined second schedule specific to the one or more usage dimensions.

Scheduling the maintenance of the data glossary may allow for adapting the frequency of the measurements to the time scale of changes that is typically observed in the given data glossary. Scheduling the maintenance of the data glossary specific to the maintenance reasons may allow for adapting different time scales depending on the perceived importance of a given maintenance reason. Thus, computational resources may be saved for the maintenance (measurement of usage dimensions and performance of the respective maintenance action) of terms under less important maintenance reasons. Similarly, the specific traits of evidence observed by the usage measuring algorithms of different usage dimensions may be subject to different typical time scales of change, and it may therefore be beneficial to adapt the frequency of glossary maintenance to these typical time scales to save computational resources for usage dimensions measuring more slowly changing evidence. In some embodiments, the usage dimension is based on the usage of a term by one or more users.

According to some embodiments, the usage measuring algorithm is adapted for performing the determination of the value of the usage dimension additionally based on evidence of usage of the maintained term in a data catalog comprising metadata about data elements, the metadata comprising indications of usage of the maintained terms by the data elements. A data catalog may be an instrument of a data governance policy that divides the total amount of information owned by an enterprise into informational assets (such as the data structures and content-bearing data elements described herein which may include, without limitation, text-based content and documents such as reports, notebooks, and presentations; tables, databases, and other structured or organized content; images, videos, and other media content; and operative data such as the data glossary or training sets for machine learning models) and metadata descriptive of the informational assets (such as, without limitation, keywords, timestamps, header information, labels, flags, attributes, user and entity specific information, log files, etc.). A data catalog may comprise some or all of the metadata that is owned (preferably on a global scale) by the enterprise (or any other owning entity) operating the data glossary. The metadata may contain information about usage of the maintained terms by the informational assets, in explicit form and/or as implicit evidence that has to be interpreted to determine whether a term is used by the informational assets or not. Having access to a data catalog may yield a more significant selection of candidate terms compared to approaches relying only on the relational information provided by the data glossary.

According to some embodiments, the metadata further comprises assignments of one or more labels selected from a predefined group of one or more labels to the data elements, each label within the group of one or more labels being represented by one of the one or more usage dimensions. This may allow for reducing the requirement of computing resources for performing embodiments of the method, e.g., by limiting the measurement only to (e.g., user-defined) labels of interest such that only a relevant portion of the data catalog is searched for the evidence. In this way, a given usage dimension may be fanned out into sub-dimensions that are specific only to such evidence that falls under the present trait of interest reflected by the choice of the label. It may also be possible to determine the value of a given usage dimensions as an "aggregate dimension" depending on multiple values of the sub-dimensions that were measured for some or all of the labels in the group of labels. This may allow for partitioning the workload of performing embodiments of the method into smaller chunks that can be processed within shorter time windows without blocking computational resources for other processes to be executed in the computing environment for too long.

According to some embodiments, each usage dimension is normalized to the range between and including 0 and 1. This may provide a universal measure that may be more easily interpretable by a human user (e.g., a value of 0 representing no evidence in the given usage dimension, and a value of 1 representing a term having most evidence in the given usage dimension compared to any other of the maintained terms) and may enable an improved comparability of different usage dimensions. The normalization may also allow for processing the resulting values of the measurement by a generic mathematical approach that is not specific to the usage dimensions. This may simplify the definition of the usage measuring algorithms and may provide a greater flexibility for promptly including newly defined usage dimensions in the overall glossary maintenance process without compatibility checks by a software developer.

Figure 1:
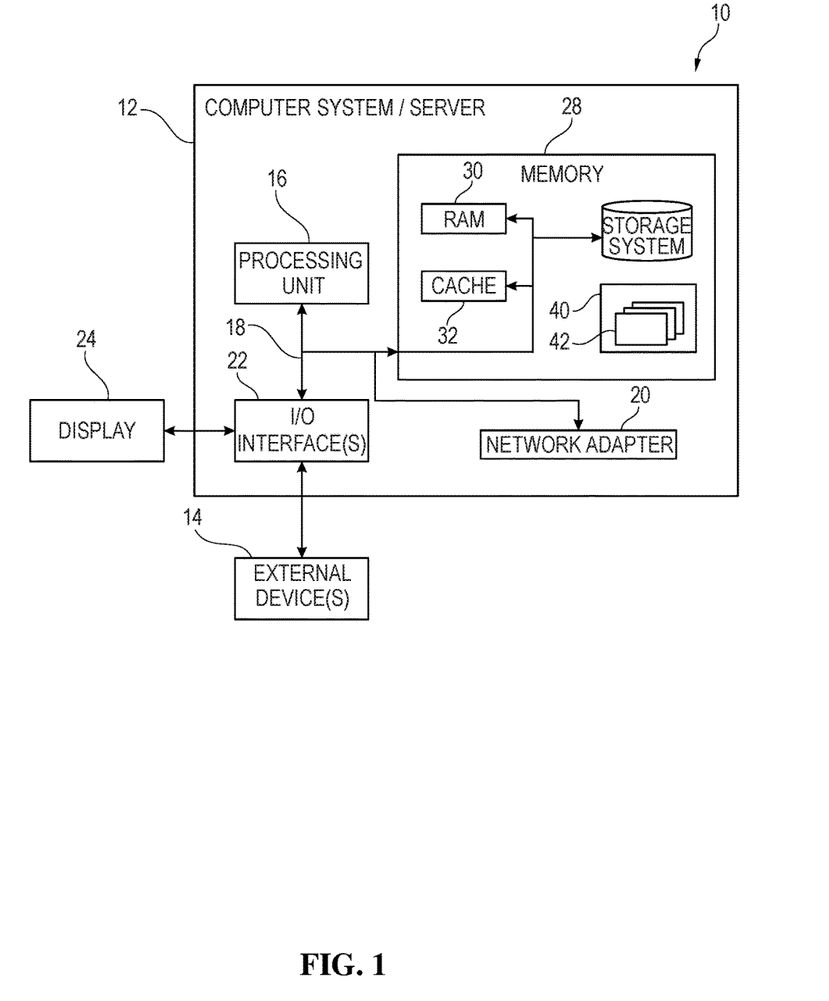
FIG. 1 depicts the representative major components of a computer system that may be used in accordance with embodiments.

Embodiments of the present invention may be implemented using a computing device that may also be referred to as a computer system, a client, or a server. Referring now to FIG. 1, a schematic of an example of a computer system is shown. Computer system 10 is only one example of a suitable computer system and is not intended to suggest any limitation as to the scope of use or functionality of embodiments of the invention described herein. Regardless, computer system 10 is capable of being implemented and/or performing any of the functionality set forth hereinabove.

In computer system 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computer system 10 is shown in the form of a general-purpose computing device. The components of computer system/server 12 may include, but are not limited to, one or more processors 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

A computer system such as the computer system 10 shown in FIG. 1 may be used for performing operations disclosed herein such as maintaining a data glossary. Such computer system may be a standalone computer with no network connectivity that may receive data to be processed, such as the maintained terms and the selection of confirmed terms, through a local interface. Such operation may, however, likewise be performed using a computer system that is connected to a network such as a communications network and/or a computing network.

Figure 2:
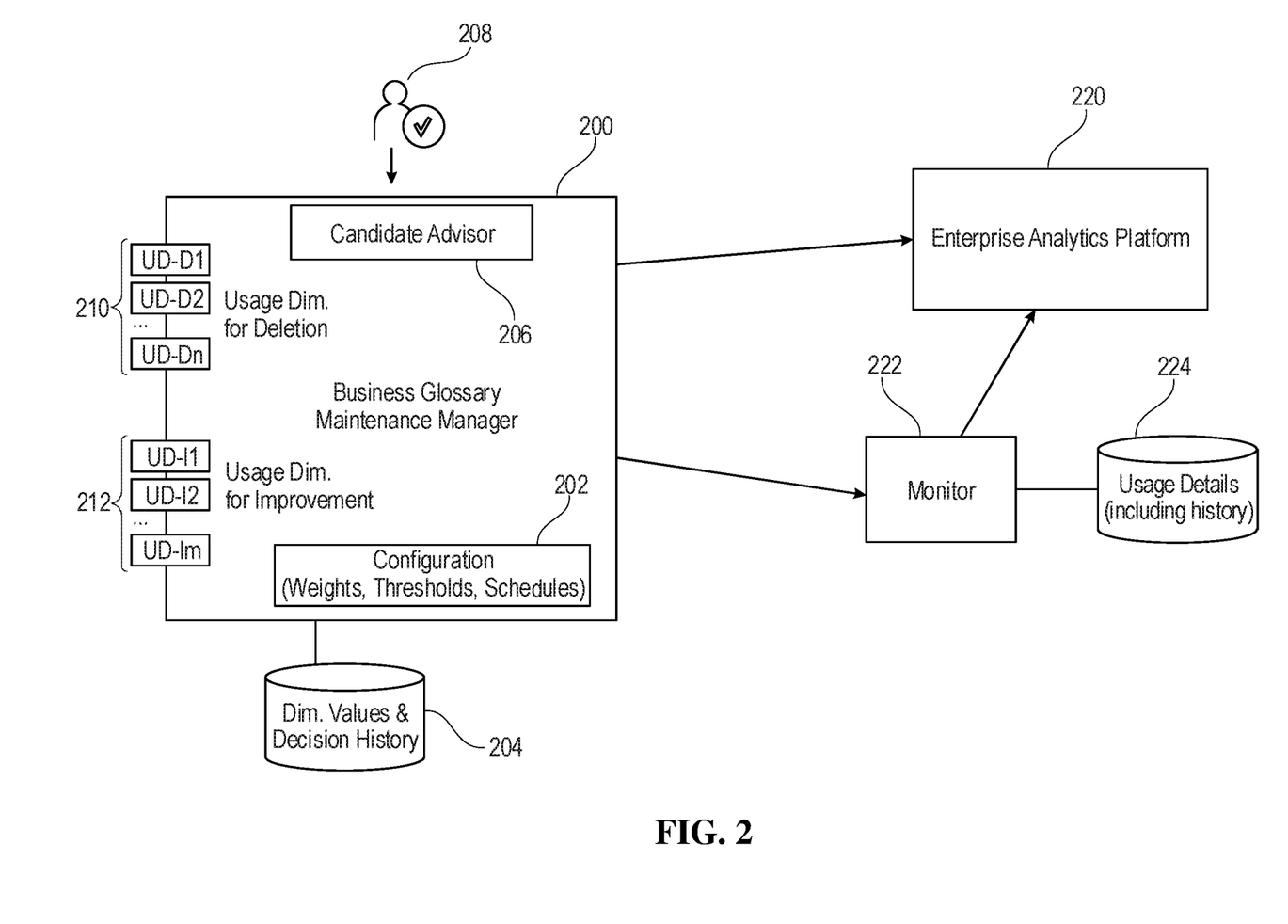
FIG. 2 illustrates an example software environment that may be used in accordance with embodiments.

FIG. 2 shows an example software environment that may be configured for executing embodiments of the method. The software environment may be implemented on hardware that may include a single computing system 10 or multiple computer systems 10 interconnected by a computing network. Some or all hardware devices provisioned for implementing the software environment may be virtualized.

The software environment of FIG. 2 may comprise a business glossary maintenance manager 200 executing an embodiment of the method. The manager 200 may exchange information with an enterprise analytics platform 220 and a monitor 222. An enterprise analytics platform is a large-scale enterprise software package on which companies do their analytical research and comprise the data. In some embodiments, enterprise analytics platform 220 is run and/or stored on computer system 10, where the software is stored in memory 28 and processed on processing unit 16. The manager 200 may exchange information with a deciding entity 208 (e.g., a user or a suitable artificial intelligence engine) and a first memory 204. The monitor 222 may exchange information with the platform 220 and a second memory 224. In the non-limiting example of FIGS. 2 and 3, the platform 220 may comprise a data glossary 300. The manager 200 may access a plurality of maintained terms stored within the data glossary 300.

Figure 4:
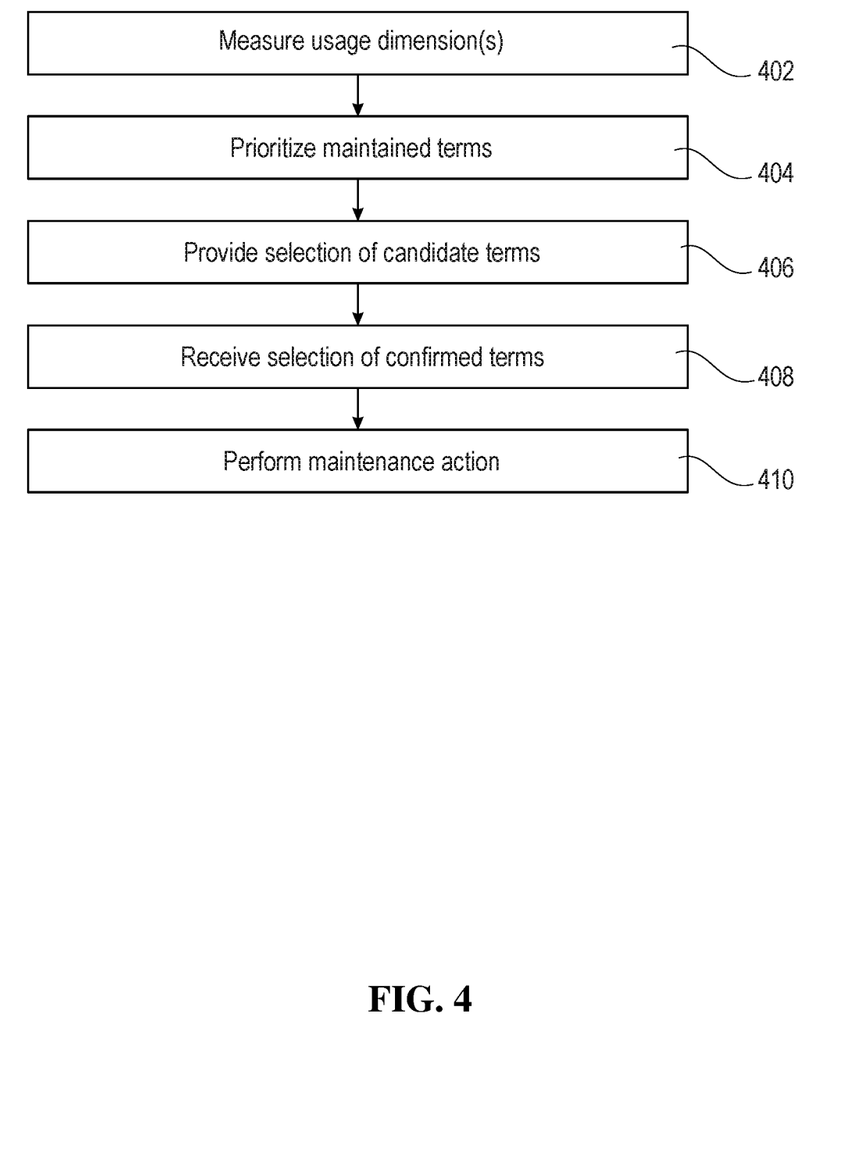
FIG. 4 depicts an example computer-implemented method of maintaining a data glossary.

The business glossary maintenance manager 200 may comprise a candidate advisor logic 206 that may comprise an implementation of embodiments of the method, comprising maintenance steps such as the steps 402-410 shown in FIG. 4. In the non-limiting example of FIG. 2, the manager 200 may be configured for maintaining the glossary 300 according to the two maintenance reasons "infrequent use" and "need for improvement". The manager 200 may incorporate n usage dimensions 210 specific to the infrequent use and m usage dimensions 212 specific to the need for improvement. The manager may perform the glossary maintenance using configuration attributes 202 (e.g., dimension weights, one or more of the threshold values disclosed herein, and schedules such as a global schedule and/or schedules specific to the maintenance reasons and/or to the usage dimensions). In an example, the manager 200 may load the configuration 202 from the first memory 204 on startup and may store outputs of the glossary maintenance (such as measured dimension values and the received selection of confirmed terms and/or a further selection of any non-confirmed or rejected terms) in the first memory 204.

Figure 3:
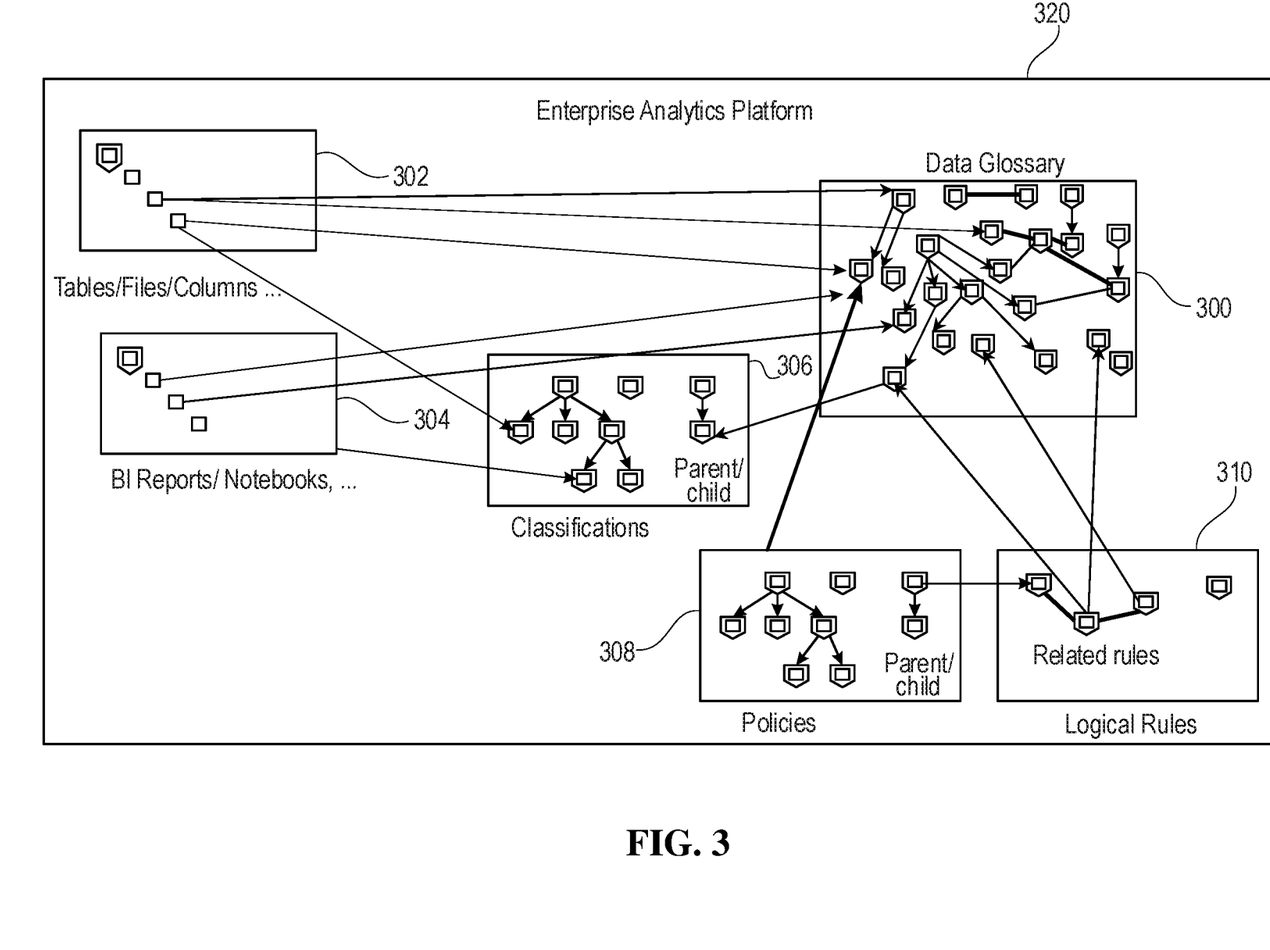
FIG. 3 illustrates a schematic visualization of an example relationships that may occur for terms of a data glossary.

The logic 206 may be started, e.g., according to a general or specific schedule, and/or event-based such as when a number of changes monitored by the monitor 222 in the data glossary 300 since the latest previous execution of the glossary maintenance equals or exceeds a predefined threshold value. The logic 206 may cause a maintenance of the data glossary 300 according to multiple maintenance reasons (e.g., by subsequent or parallel processing of maintenance steps specific to each assessed maintenance reason), according to a single maintenance reason identified by a call by a maintenance reason-specific schedule, or limited to one or more selected usage dimensions (that may be specific to one or more of the maintenance reasons) identified by a call by a usage dimension-specific schedule.

For a given maintenance reason, the logic 206 may process the maintained terms in order to determine for each maintained term whether it appears worthwhile to execute a maintenance action associated with the given maintenance reason on that term. Not all of the maintained terms may be analyzed, depending on status characteristics such as skip indicators that may be set for some of the maintained terms. Not all of the usage dimensions specific to the given maintenance reason may be measured, depending on configuration attributes 202 such as dimension weights or criticality indicators that may be set for some of the usage dimensions.

For a given maintained term, the logic may measure, e.g., step 402 below, the applicable usage dimensions by executing a usage measuring algorithm for each applicable usage dimension of the given maintenance reason. A usage measuring algorithm may receive the given maintained term (e.g., the term string, the term dataset or a static descriptor of the term dataset), and in response thereto, determine a value of the corresponding usage dimension that is for the given maintained term. For this purpose, the usage measuring algorithm may access resources including the data glossary 300, and optionally, further data structures, data elements, and informational assets that may be available in the enterprise analytics platform 220 and/or in the hardware computing environment hosting the software environment to search for evidence of usage of the given maintained term in these resources. The usage measuring algorithm may determine the value of the given usage dimension, e.g., by counting relationships of the given maintained term, and/or by analyzing other metadata of that term such as access history data and statistics that may be provided at least in part by the monitor 222, e.g., in the second memory 224, and/or user-provided information such as ratings and comments for the given maintained term. The collection of evidence of usage may be limited to a predefined time period.

After measuring the applicable usage dimensions of the given maintenance reason for the applicable maintained terms, the logic 206 may prioritize, in step 404 below, the measured maintained terms based on the values of the usage dimensions that were measured for each applicable term. This may include determining a maintenance priority for each given term that is defined as an assumed representation of likelihood that the given term requires an execution of said maintenance action. As an example, the maintenance reason "infrequent use" represented by the usage dimensions 210 may have defined a deletion of the given term as the applicable maintenance action, and the maintenance reason "need for improvement" represented by the usage dimensions 212 may have defined an addition of the given term to a list of terms to be improved as the applicable maintenance action. The maintenance priority of a given term may be based on one or more of the values of usage dimensions that were measured for the given term, e.g., by means of a predefined mathematical function.

The logic 206 may provide, below in step 406 below, a selection of candidate terms by applying a criterion on the maintenance priority of the prioritized terms. For instance, only those prioritized terms having a maintenance priority that exceeds a predefined candidate threshold value may be included in the selection of candidate terms. The candidate terms (the term datasets or their term strings or static identifiers) may be provided to a deciding entity 208 such as a user or an appropriately effective and configured artificial intelligence unit such as a trained machine-learning model (e.g., a trained neural network). In some embodiments, the logic may provide the term or candidate terms to a user.

In response to the provision, from step 406 below, the logic 206 may receive, below in step 408, a selection of confirmed terms that the deciding entity 208 selected from the selection of candidate terms to confirm that the applicable maintenance action shall be performed on the confirmed terms. Optionally, the logic may also receive a selection of those candidate terms for which the execution of the respective maintenance action has been rejected. The selection of confirmed terms and, where applicable, the selection of rejected terms may be stored, e.g., in the first memory 204. For each of the confirmed terms, the logic 206 may cause, in step 410 below, an execution of the maintenance action of the given maintenance reason on each of the confirmed terms. The rejected terms may be checked during a subsequent later performance of embodiments of the method such that the rejected terms may be exempt from reassessment of the applicable maintenance reason(s), e.g., within a predefined skipping time period. In some embodiments, the logic may receive, from the user, a directive to proceed with the maintenance action, and include the term in the candidate terms for performing the maintenance action.

FIG. 3 shows a schematic visualization of example relationships that may occur for terms of a data glossary 300 hosted by an enterprise analytics platform 320 (may be similar to enterprise analytics platform 220). For instance, the data glossary 300 may store interrelationships of its terms, such as parent/child relationships, part or containment relationships, synonyms, alternatives, etc. The platform 320 may further host structured data elements 302 (e.g., tables, files, lists, columns, . . . ) and content-based data elements 304 (e.g., business intelligence reports, notebooks, training sets for machine-learning models, . . . ) where terms of the data glossary may occur explicitly or implicitly. Furthermore, the platform 320 may host logical classifications 306 which may be used to label the data structures and elements 302, 304 and that may correspond to terms of the data glossary 300. The platform 320 may further host policies 308 that may be organized by hierarchical relationships and may use or otherwise relate to certain terms of the glossary 300, and logical rules 310 such as governance rules that may be organized by similarity groups and may likewise use or otherwise relate to certain terms of the glossary 300. The data glossary 300 and/or the second memory (e.g., 224 from FIG. 2) may store a relationship attribute for each relationship of and between terms of the data glossary 300 (internal relationships) and/or structured data elements 302, data elements 304, classifications 306, policies 308 and rules 310 (external relationships) for any participant in an external relationship that also exhibits a relationship to one of the terms in the data glossary 300.

FIG. 4 shows steps of an example computer-implemented method of maintaining a data glossary 300 that may be executed independently for each of one or more predefined maintenance reasons. A step 402 may comprise measuring one or more usage dimensions for each of a group of maintained terms in the data glossary 300. This may be done be executing a usage measuring algorithm specifically assigned to the given usage dimension. The usage measuring algorithm may receive a representation of the given maintained term and, in response thereto, provide a value of the given usage dimension determined by the algorithm based on evidence of usage of the given term found at least in the data glossary 300.

A step 404 may comprise prioritizing the maintained terms, which may include determining a maintenance priority for each maintained term that is based on the value(s) for the given term in one or more of the measured usage dimensions. The maintenance priority may be defined such that it represents a likelihood that the given maintained term requires an execution of a maintenance action assigned to the given maintenance reason.

A step 406 may comprise providing a selection of those prioritized terms whose maintenance priority exceeds a predefined candidate threshold as candidate terms to a deciding entity 208 which may be, without limitation, a user or an artificial intelligence module capable of deciding whether the applicable maintenance action should indeed be performed on each of the candidate terms or not.

A step 408 may comprise receiving a selection of confirmed terms for which the deciding entity has confirmed that the maintenance action corresponding to the given maintenance reason shall be performed. The performance of the maintenance action for the confirmed terms may be realized as a step 410.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method comprising:
   receiving a data glossary comprising a list of terms;
   training a machine learning model with one or more training sets of data based on the data glossary;
   measuring a usage dimension for a set of the terms from the list of terms;
   selecting candidate terms from the set based on the usage dimension with the trained machine learning model, wherein the usage dimension indicates a need for definition improvement of the selected candidate terms, wherein the usage dimension is based on frequency of use and need for improvement;
   determining maintenance priority for the candidate terms based on the usage dimension; and
   performing a maintenance action on the candidate terms based on the selecting by the machine learning model and the maintenance priority.

2. The method of claim 1, the selecting further comprising:
   determining that a term has crossed a maintenance threshold based on the usage dimension.

3. The method of claim 2 the selecting further comprising:
   providing the term to a user;
   receiving, from the user, a directive to proceed with the maintenance action; and
   including the term in the candidate terms.

4. The method of claim 1, further comprising:
   storing one or more relationship attributes representing a related data structure for a grouping of the terms.

5. The method of claim 4, wherein the data structure is selected from the group consisting of a logical rule, a file, a file type, and a content type.

6. The method of claim 1, further comprising:
skipping the performing of the maintenance action for a term based on a skip indicator in the data glossary.

7. The method of claim 1 the measuring further comprising:
using a maintenance algorithm to determine the usage dimension of a term;
including the term in the list of terms considered for the maintenance action; and
prioritizing the list of terms considered for the maintenance action based on a maintenance priority.

8. The method of claim 1, wherein the usage dimension is based on the usage of a term by one or more users.

9. A system comprising:
a memory; and
a processor in communication with the memory, the processor being configured to perform processes comprising:
receiving a data glossary comprising a list of terms;
training a machine learning model with one or more training sets of data based on the data glossary;
measuring a usage dimension for a set of the terms from the list of terms;
selecting candidate terms from the set based on the usage dimension with the trained machine learning model, wherein the usage dimension indicates a need for definition improvement of the selected candidate terms, wherein the usage dimension is based on frequency of use and need for improvement;
determining maintenance priority for the candidate terms based on the usage dimension; and
performing a maintenance action on the candidate terms based on the selecting by the machine learning model and the priority.

10. The system of claim 9, the selecting further comprising:
determining that a term has crossed a maintenance threshold based on the usage dimension.

11. The system of claim 10 the selecting further comprising:
providing the term to a user;
receiving, from the user, a directive to proceed with the maintenance action; and including the term in the candidate terms.

12. The system of claim 9, the process further comprising:
storing one or more relationship attributes representing a related data structure for a grouping of the terms.

13. The system of claim 12, wherein the data structure is selected from the group consisting of a logical rule, a file, a file type, and a content type.

14. The system of claim 9, the process further comprising:
skipping the performing of the maintenance action for a term based on a skip indicator in the data glossary.

15. The system of claim 9, the measuring further comprising:
using a maintenance algorithm to determine the usage dimension of a term;
including the term in the list of terms considered for the maintenance action; and
prioritizing the list of terms considered for the maintenance action based on a maintenance priority.

16. The system of claim 9, wherein the usage dimension is based on the usage of a term by one or more users.

17. A computer program product comprising a computer readable storage medium having program instructions embodied therewith, the program instructions executable by a processor to cause the processors to perform a method, the method comprising:
receiving a data glossary comprising a list of terms;
training a machine learning model with one or more training sets of data based on the data glossary;
measuring a usage dimension for a set of the terms from the list of terms;
selecting candidate terms from the set based on the usage dimension with the trained machine learning model, wherein the usage dimension indicates a need for definition improvement of the selected candidate terms, wherein the usage dimension is based on frequency of use and need for improvement;
determining maintenance priority for the candidate as based on the usage dimension; and
performing a maintenance action on the candidate terms based on the selecting by the machine learning model and the maintenance priority.

18. The computer program product of claim 17, the selecting further comprising:
determining that a term has crossed a maintenance threshold based on the usage dimension.

19. The computer program product of claim 17 the selecting further comprising: providing the term to a user;
receiving, from the user, a directive to proceed with the maintenance action; and including the term in the candidate terms.

20. The computer program product of claim 17, the method further comprising:
storing one or more relationship attributes representing a related data structure for a grouping of the terms.

* * * * *